United States Patent [19]
Jackson

[11] 4,188,765
[45] Feb. 19, 1980

[54] DUAL DUROMETER FLANGE COVER

[75] Inventor: Norman C. Jackson, Livonia, Mich.

[73] Assignee: The Standard Products Company, Dearborn, Mich.

[21] Appl. No.: 914,935

[22] Filed: Jun. 12, 1978

[51] Int. Cl.$^2$ .............................................. E04F 19/02
[52] U.S. Cl. ...................................... 52/716; 49/490; 52/309.16; 428/122; 428/217
[58] Field of Search ...................... 52/309.16, 403, 716, 52/717; 49/490; 428/122, 217; 296/93

[56] References Cited

U.S. PATENT DOCUMENTS

| | | | |
|---|---|---|---|
| 1,704,998 | 3/1929 | Atzenhoffer | 49/441 |
| 2,607,091 | 8/1952 | Dodge | 49/479 |
| 2,986,793 | 6/1961 | Bright | 24/259 |
| 3,159,886 | 12/1964 | Lynch | 49/479 |
| 3,165,793 | 1/1965 | Lynch | 49/479 |
| 3,167,825 | 2/1965 | Zoller | 49/490 |
| 3,167,856 | 2/1965 | Zoller | 49/490 X |
| 3,177,534 | 4/1965 | Millhouse et al. | 52/394 |
| 3,222,769 | 12/1965 | Le Plae | 52/716 X |
| 3,238,583 | 3/1966 | Bright | 24/81 |
| 3,310,928 | 3/1967 | Weimar | 52/716 |
| 3,363,364 | 1/1968 | Cadiou | 49/490 |
| 3,371,447 | 3/1968 | Ruff et al. | 49/490 |
| 3,543,465 | 12/1970 | Jackson | 52/716 |
| 3,638,359 | 2/1972 | Kruschwitz | 52/717 X |
| 3,706,173 | 12/1972 | Taylor | 52/716 |
| 3,922,460 | 11/1975 | Jackson | 428/217 |
| 4,042,741 | 8/1977 | Bright | 49/490 |
| 4,092,813 | 6/1978 | Eggert | 52/716 X |

FOREIGN PATENT DOCUMENTS 51-51394  11/1976  Japan .

*Primary Examiner*—Alfred C. Perham
*Attorney, Agent, or Firm*—Harness, Dickey & Pierce

[57] ABSTRACT

A flange cover for embracing engagement with and clamping retention on a flange edge. The flange cover is an elongated strip of a generally U-shaped cross section defining a pair of legs connected by a web. Each leg has at least one retention lip extending inwardly therefrom and is made of a lower durometer thermoplastic material than the web. The flange cover is made by extruding a flat, elongated strip with a middle portion of higher durometer than side portions, said side portions having retention lips projecting therefrom, and then bending the strip along its longitudinal axis to form a flange cover having a U-shaped cross section.

5 Claims, 4 Drawing Figures

DUAL DUROMETER FLANGE COVER

BACKGROUND AND SUMMARY OF THE INVENTION

The present invention relates to protective covers, referred to as flange covers, which are employed to protect, seal and provide a more pleasing appearance to the edges of a flange, pinchweld or other raw edges such as are often found on automotive bodies, marine bodies and protective head gear. Flange covers are often also used to support a sealing strip or bubble to seal doors, windows and other apertures.

The prior art includes several patents directed to flange covers and methods by which they can be made. Examples include Japanese Patent Application No. 51-51394, filed May 7, 1976, and the following U.S. Pat. Nos.: 3,177,534, Apr. 13, 1965 to Matthoun et al; 3,371,447, Mar. 5, 1968 to Fuff et al; 3,222,769, Dec. 14, 1965 to LePlac; 3,310,928, Mar. 28, 1967 to Weimar; 3,238,583, Mar. 8, 1966 to Bright; 2,607,091, Aug. 19, 1952 to Dodge; 2,986,793, June 6, 1961 to Bright; 3,159,886, Dec. 8, 1964 to Lynch; 3,167,856, Feb. 2, 1965 to Zoller; 3,167,825, Feb. 2, 1965 to Zoller; 3,638,359, Feb. 1, 1972 to Kruschwitz; 3,165,793, Jan. 19, 1965 to Lynch; 3,706,173, Dec. 19, 1972 to Taylor; 3,766,697, Oct. 23, 1973 to Jackson; and 3,363,364, Jan. 16, 1968 to Cadion.

Although it is known in the art to make a flange cover with retention lips of a lower durometer than the rest of the flange cover, such flange covers have certain deficiencies in flexibility, stability, retention and ease of installation due to the bending characteristics of a structure having a U-shaped cross section with legs and web of a single durometer. Generally speaking, in bending a single durometer cover to fit an inside corner, the web portion is compressed while the leg portion is stretched. Conversely, an outside corner requires compression of the leg portion and expansion of the web portion. High durometer flange covers are strong but also difficult to expand or compress. The lower the durometer of the flange cover, the easier installation becomes because the legs and web are easier to stretch and compress. Also, low durometer retention lips improve the retention of the cover on a flange edge.

Unfortunately, a single durometer flange cover having a low durometer also has a tendency to stretch out of shape and twist in corners during installation. As a result, low durometer flange covers can be difficult to install. Also, low durometer flange covers tend to pull away from corners after installation as they recover from the stretching required during installation.

Wherefore, it is an object of the present invention to gain the advantages of both high and low durometer materials in flange covers. It is another object to provide a flange cover which can be easily installed and will not tend to pull away from corners. It is another object of the present invention to provide an economical and practical process for making a flange cover of the present invention. These and other objects are achieved by the present invention which relates to a flange cover having a generally U-shaped cross section defining a pair of legs and a web and wherein the web comprises a higher durometer thermoplastic material than the legs, each of which have retention lips extending inwardly therefrom for frictional engagement of the flange cover with a flange. The present invention also relates to a method of making the flange cover by extruding a flat, elongated strip having a middle portion of higher durometer than both side portions and then bending the strip along its longitudinal axis to form a flange cover having a U-shaped cross section.

DESCRIPTION OF THE INVENTION

Figure 1:
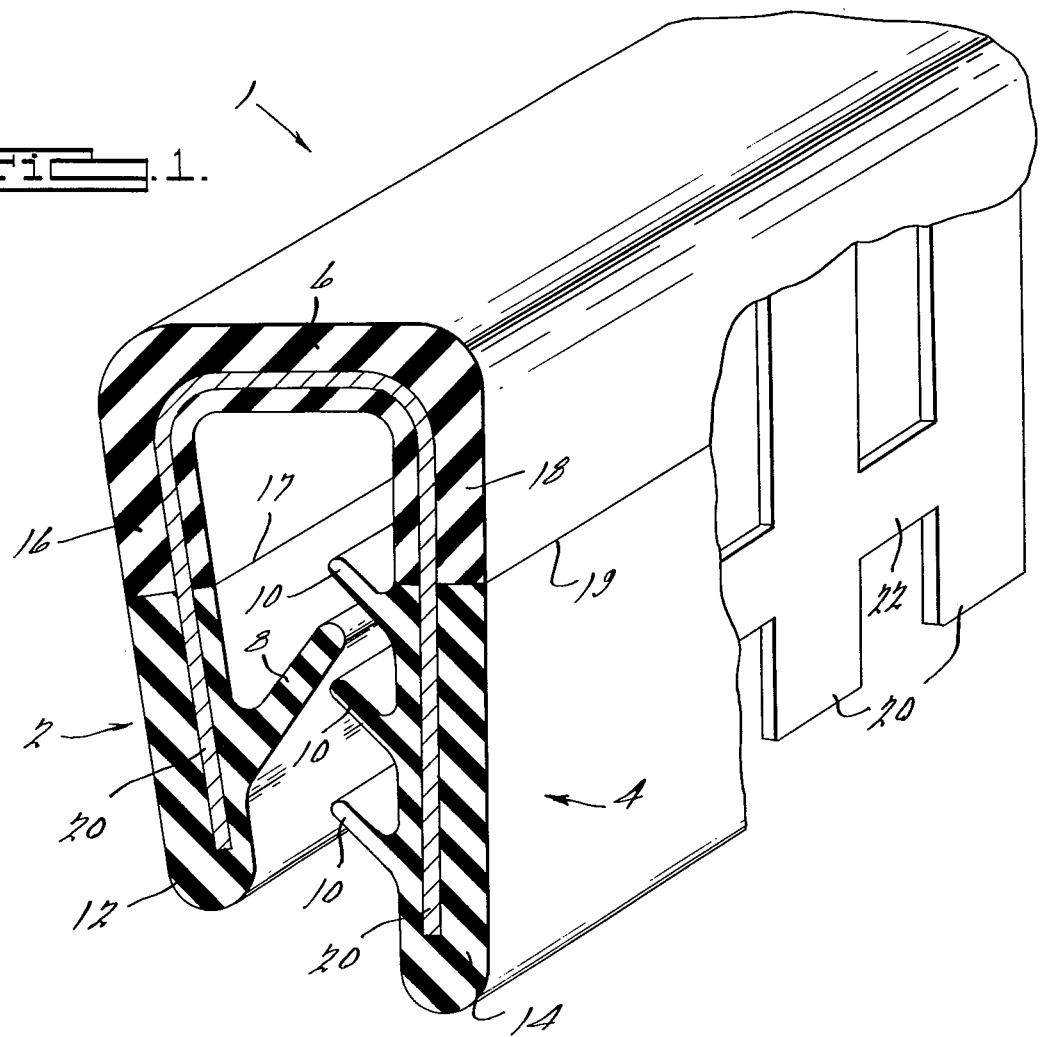
FIG. 1 is a perspective view, in section and broken away, of a flange cover of the present invention.

Now referring to the drawing, FIG. 1 shows an embodiment of the present invention wherein a flange cover, indicated generally by numeral 1, has a generally U-shaped cross section defined by legs 2 and 4 and web 6 connecting and supporting legs 2 and 4 and formed integrally therewith. Legs 2 and 4 can be the same or different lengths. As shown in FIG. 1, leg 4 is slightly longer than leg 2. Integrally formed with leg 2 is lip 8 which projects inwardly and upwardly and in opposing relationship to lips 10 which project inwardly and upwardly from leg 4 and are formed integrally therewith. Lips 8 and 10 serve the purpose of frictionally and retainably gripping the side surfaces of a supporting flange edge when the flange cover is attached thereto. Of course, the exact number of lips is not critical so long as they are sufficient to retain the flange cover on the flange.

In accordance with the present invention, web 6 is made of a higher durometer material than legs 2 and 4. In accordance with the embodiment of the present invention shown in FIG. 1, lips 8 and 10 and leg portions 12 and 14 of legs 2 and 4 are made of a relatively low durometer thermoplastic material while web 6 including web portions 16 and 18 at the upper part of legs 2 and 4 is made of a relatively higher durometer thermoplastic material. It is contemplated that leg portions 12 and 14 and lips 8 and 10 will be made of a thermoplastic material having a durometer of from about 55 to about 80, preferably from about 60 to about 70 and web 6 including web portions 16 and 18 will be made of a thermoplastic material having a durometer at least 10 units greater within the range of about 65 to about 95, preferably from about 80 to about 90. All durometer measurements are in accordance with ASTMD 224D Shore A, 15 second delay.

Referring now again to FIG. 1, it is preferred that the flange cover 1 of this invention have a plurality of reinforcing ribs 20 connected by frangible connectors 22 and encompassed by the thermoplastic material forming legs 2 and 4 and web 6. Ribs 20 can be made of metal or of a suitable plastic material and serve the function of providing additional strength to the structure of the dual durometer flange cover of the present invention. As shown in FIG. 1, ribs 20 are bent to have substantially the same U-shape cross section as legs 2 and 4 and web 6.

Although distinct lines 17 and 19 are shown between web portions 16 and 18 and leg portions 12 and 14, there need not be any exact line between the higher durometer material and the lower durometer material. If the thermoplastic materials of different durometers are extruded together as is contemplated in the method of this invention then there will most likely be a fusing of the materials resulting in a certain amount of blending in the zones between the higher and lower durometer thermoplastic materials. Furthermore, the exact position of the line or zone of demarcation between higher and lower durometer material can vary upward or downward along legs 2 and 4 so long as the objects of the present invention are achieved.

Figure 2:
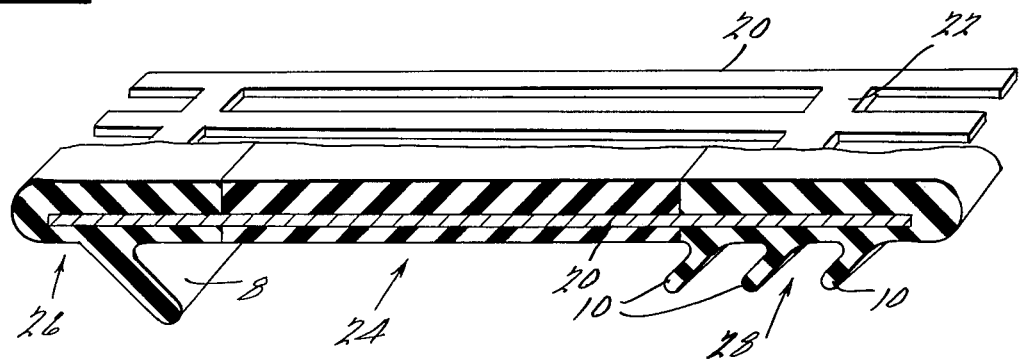
FIG. 2 is a perspective view, in section and broken away, of a flat strip structure prior to bending along its longitudinal axis to form the flange cover of FIG. 1.

Now referring to FIG. 2, a dual durometer flange cover of the present invention is shown in its flat form before bending along its longitudinal axis to form a U-shaped cross section. The flange cover of this invention can be manufactured by first extruding thermoplastic materials, such as polyvinyl chloride, into a flat strip as shown in FIG. 2 having a middle zone 24 of a higher durometer than side zones 26 and 28, and then bending the strip to the desired flange edge gripping U-shaped structure. Optionally, the flange cover can have an outer finish of an embossed or laminated woodgrain appearance. Also, a skin may be used to form a bubble on the outside of the cover for use as a seal.

Figure 3:
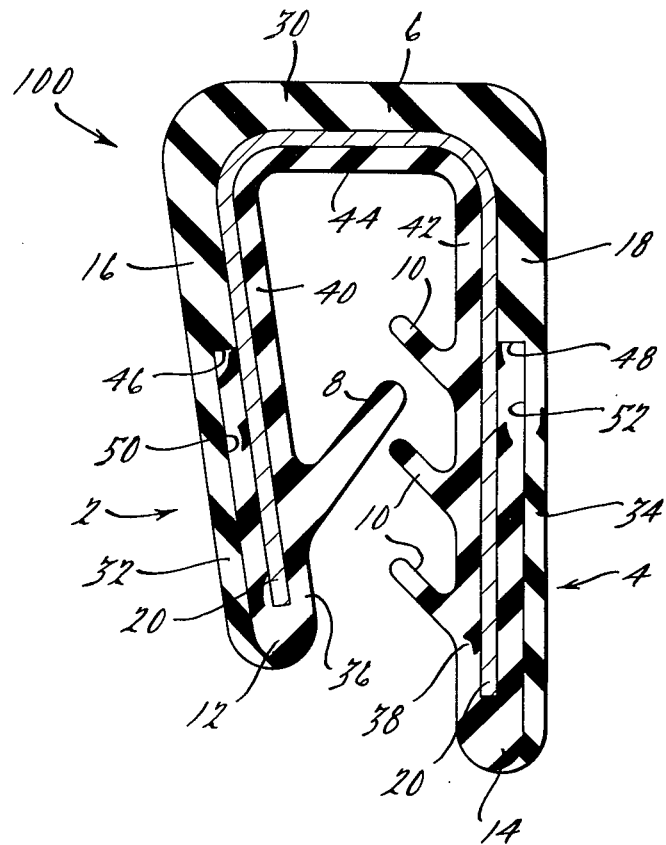
FIG. 3 is a cross-sectional view illustrating an alternative embodiment of the present invention.
Figure 4:
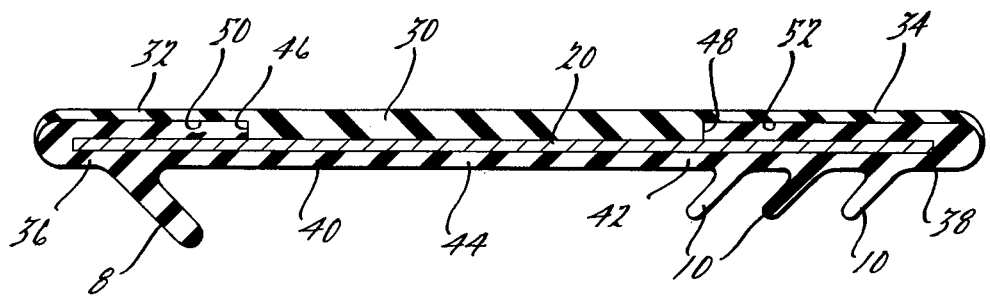
FIG. 4 is a cross-sectional view of the embodiment of FIG. 3 shown in its flat strip form prior to bending along its longitudinal axis to form a U-shaped cross section.

FIGS. 3 and 4 illustrate another embodiment of the present invention wherein further advantage is taken of the use of thermoplastic materials of relatively lower and higher durometer in the web and leg portions of a flange cover. As shown in FIG. 3, a flange cover, generally indicated by the numeral 100, has a generally U-shaped cross section defined by legs 2 and 4 and web 6. As in flange cover 1 previously described, flange cover 100 comprises thermoplastic materials having a higher average durometer than the average durometer of the thermoplastic materials comprising leg portions 12 and 14. A plurality of reinforcing ribs 20 are imbedded in the thermoplastic materials.

It is contemplated that the lower durometer thermoplastic materials can contain or comprise chemical ingredients which are subject to degradation upon exposure to the weather elements. For example, the lower durometer material can comprise nitrile rubber. To avoid exposure of the lower durometer material to the elements, the higher durometer thermoplastic of back 30 extends to web portions 16 and 18 of web 6 and further extends to provide leg covering layers 32 and 34 along the outside of legs 2 and 4 respectively.

It has also been found that manufacture of flange covers of the present invention can be facilitated wherein leg portions 12 and 14 largely comprise lower durometer thermoplastic material as at 36 and 38 extending to lips 8 and 10 and wherein the lower durometer material extends along the interior of flange cover 100 at inner web portions 40, 42 and 44.

As in flange cover 1, exact lines of separation are shown between the higher and lower durometer material of flange cover 100, but it is contemplated that the materials will fuse together and exact lines of separation therebetween are not necessary to the present invention. Furthermore, the exact location of lines of separation 46 and 48 separating web 6 of higher durometer thermoplastic from leg portions 12 and 14 is not critical nor is the exact location of lines of separation 50 and 52 separating extensions 32 and 34 from leg portions 12 and 14 so long as the higher durometer and lower durometer materials are employed substantially in the areas taught in this disclosure where the higher durometer material provides structural strength and is located on the web of the flange cover and the lower durometer material is employed on the legs to provide the flexibility and friction desired of legs and lips of the flange cover.

As in the method for making the embodiment of FIG. 1, flange cover 100 can be made by first extruding thermoplastic materials such as polyvinyl chloride materials, into a flat strip as shown in FIG. 4. Then, the strip is bent along its longitudinal axis to form the desired structure of a U-shaped cross section.

While a specific embodiment of this invention has been described and illustrated herein, it is to be understood that the invention may be varied within the scope of the appended claims without departing from the spirit of the invention.

What is claimed is:

1. In a flange cover for frictionally engaging a supporting edge flange, said cover comprising an elongated strip of thermoplastic material folded longitudinally thereof so that said strip is substantially U-shaped in cross section defined by a web portion and a pair of spaced leg portions, said elongated strip of thermoplastic material being supported by a core structure comprising a plurality of longitudinally spaced, parallel ribs whereby the web and leg portions of said thermoplastic strip have interior and exterior portions on opposite sides of said core structure, the improvement wherein each leg portion of said strip has an average durometer less than the average durometer of the web portion thereof, the exterior portion of each leg of said thermoplastic strip having a durometer relatively higher than the durometer of the interior portion thereof.

2. A flange cover as recited in claim 1 wherein each of said legs have at least one lip projecting inwardly therefrom of like durometer to the durometer of the interior portion thereof.

3. A flange cover as recited in claim 2 wherein the interior portions of said legs have a first durometer of from about 55 to about 80 and the exterior portions of said web and legs have an average second durometer at least ten units greater than said first durometer.

4. A flange cover as recited in claim 3 wherein the said first durometer is from about 60 to about 70 and said second durometer is from about 80 to about 90.

5. A flange cover as recited in claim 4 wherein the interior portions of said legs comprise nitrile rubber.

* * * * *